(12) United States Patent
Yu et al.

(10) Patent No.: US 11,239,753 B2
(45) Date of Patent: Feb. 1, 2022

(54) SWITCHING CONVERTER, AND CONTROL METHOD AND CONTROL CIRCUIT THEREOF

(71) Applicant: Hangzhou Silan Microelectronics CO., LTD., Hangzhou (CN)

(72) Inventors: Yongqiang Yu, Chengdu (CN); Jun Wang, Chengdu (CN); Huajie Chen, Hangzhou (CN); Zhihua Ning, Hangzhou (CN)

(73) Assignee: HANGZHOU SILAN MICROELECTRONICS CO., LTD., Hangzhou (CN)

( * ) Notice: Subject to any disclaimer, the term of this patent is extended or adjusted under 35 U.S.C. 154(b) by 0 days.

(21) Appl. No.: 16/648,293

(22) PCT Filed: Aug. 29, 2019

(86) PCT No.: PCT/CN2019/103428
§ 371 (c)(1),
(2) Date: Mar. 18, 2020

(87) PCT Pub. No.: WO2021/035642
PCT Pub. Date: Mar. 4, 2021

(65) Prior Publication Data
US 2021/0211048 A1    Jul. 8, 2021

(51) Int. Cl.
*H02M 3/158* (2006.01)
*H02M 1/00* (2006.01)
*H02M 1/14* (2006.01)

(52) U.S. Cl.
CPC .......... *H02M 3/158* (2013.01); *H02M 1/0009* (2021.05); *H02M 1/143* (2013.01)

(58) Field of Classification Search
CPC .................. H02M 1/14; H02M 1/143; H02M 2001/0009; H02M 1/0009; H02M 3/156–1588
See application file for complete search history.

(56) References Cited

U.S. PATENT DOCUMENTS

| 10,587,196 B1* | 3/2020 | Ho ......................... H02M 3/158 |
| 2007/0120547 A1* | 5/2007 | Tateishi ................ H02M 3/158 323/282 |

(Continued)

FOREIGN PATENT DOCUMENTS

| CN | 109661072 A | 4/2019 |
| CN | 209659177 U | 11/2019 |
| CN | 110545039 A | 12/2019 |

*Primary Examiner* — Fred E Finch, III
(74) *Attorney, Agent, or Firm* — Westman, Champlin & Koehler, P.A.

(57) ABSTRACT

A switching converter, control method control circuit thereof are disclosed. The switching converter converts a DC input voltage into a DC output voltage. The control circuit comprising: a compensation module, generating a ramp signal; a comparator, compares a first superimposed signal related to the DC output voltage with a second superimposed signal related to an error signal between the DC output voltage and the ramp signal; a first RS flip-flop generates a pulse width modulation signal in accordance with a set signal and a reset signal, obtains a constant on time in accordance with the reset signal, and obtains an off time related to the DC output voltage; and a driving module which converts the pulse width modulation signal into a switching control signal, wherein the compensation module adaptively adjusts the slope of the ramp signal. The control circuit adopts an adaptive ramp signal to perform compensation.

22 Claims, 8 Drawing Sheets

(56) References Cited

U.S. PATENT DOCUMENTS

| | | | | |
|---|---|---|---|---|
| 2012/0049826 A1* | 3/2012 | Hsu | ............... | H02M 3/1588 |
| | | | | 323/284 |
| 2013/0038301 A1* | 2/2013 | Ouyang | ............ | H02M 3/156 |
| | | | | 323/271 |
| 2013/0141069 A1* | 6/2013 | Li | ............ | H02M 3/158 |
| | | | | 323/283 |
| 2014/0375286 A1* | 12/2014 | Jiang | ............ | H02M 1/14 |
| | | | | 323/271 |
| 2017/0288537 A1* | 10/2017 | Jing | ............ | H02M 3/1563 |
| 2019/0229612 A1* | 7/2019 | Chen | ............ | H02M 3/04 |
| 2019/0386570 A1* | 12/2019 | Xi | ............ | H02M 3/156 |

\* cited by examiner

SWITCHING CONVERTER, AND CONTROL METHOD AND CONTROL CIRCUIT THEREOF

CROSS-REFERENCE TO RELATED APPLICATION

This application is a Section 371 National Stage Application of International Application No. PCT/CN2019/10348, filed on Aug. 29, 2019, the content of which is incorporated herein by reference.

BACKGROUND OF THE DISCLOSURE

Field of the Disclosure

The present disclosure relates to power supply technology and, more particularly, to a switching converter, and a control method and a control circuit thereof.

Description of the Related Art

A switching converter is widely used in an electronic system for generating operating voltage and current required by internal circuit modules or loads. The switching converter uses a transistor to control power transmission from an input terminal to an output terminal, thereby providing a constant output voltage and/or current at the output terminal. A ripple-based constant on-time control method used in the switching converter has advantages of good light-load efficiency, fast transient response and easy implement, and thus, it has been widely used for recent years.

Figure 1:
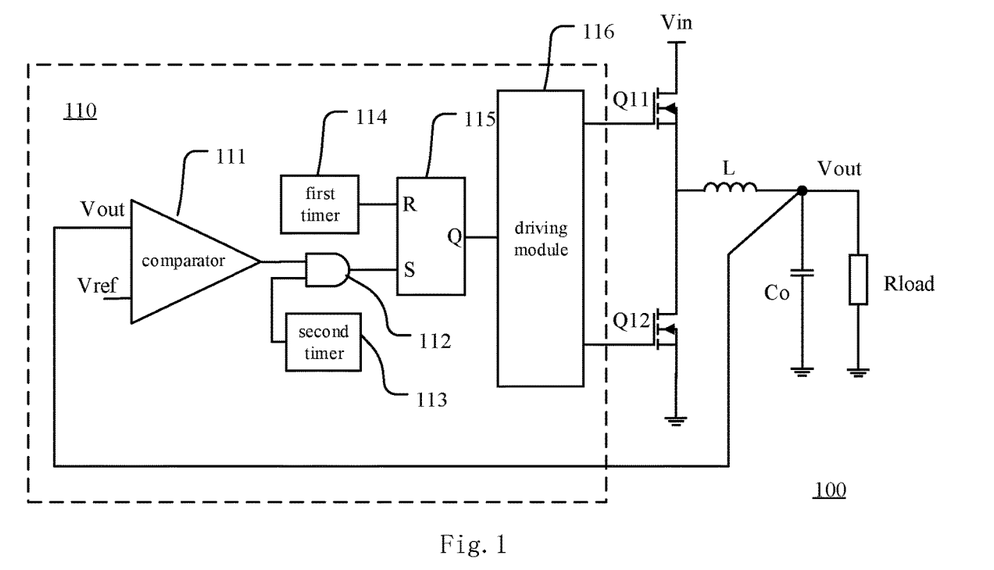
FIG. 1 shows a schematic circuit diagram of a switching converter according to the prior art.

FIG. 1 shows a schematic circuit diagram of the switching converter according to the prior art. A main circuit of the switching converter 100 includes transistors Q11 and Q12 being coupled in series between an input terminal and a ground terminal. An inductor L is coupled between an intermediate node between the transistors Q11 and Q12 and an output terminal, and a capacitor Co is coupled between the output terminal and the ground terminal. The input terminal of the main circuit receives a DC input voltage Vin, and the output terminal provides a DC output voltage Vout. A control circuit 110 of the switching converter 100 is used for providing switching control signals to the transistors Q11 and Q12.

In the control circuit 110, a first timer 114 sets a constant on time Ton of a switching cycle T, thereby generating a reset signal. A second timer 113 is used for setting a minimum off time Toff_min (or a maximum switching frequency) corresponding to a predetermined output voltage and a predetermined load. A comparator 111 compares the DC output voltage Vout with a reference voltage Vref to obtain an intermediate signal. An AND gate 112 has two input terminals for respectively receiving the intermediate signal output by the comparator and the minimum off time Toff_min, and an output terminal for providing a set signal. A RS flip-flop 115 generates a pulse width modulation signal PWM in accordance with the reset signal and the set signal. A driving module 116 converts the pulse width modulation signal PWM into the switching control signal for controlling on states of the transistors Q11 and Q12.

When the output voltage Vout is less than the reference voltage Vref, the first timer 114 sets the constant on time so that an on time of the switching control signal becomes a constant value. When the DC output voltage Vout is greater than or equal to the reference voltage Vref, an off stage of the switching control signal is active, so that an off time which is dynamically adjusted in accordance with the DC output voltage Vout, is generated. The off time is greater than the minimum off time.

Figure 2:
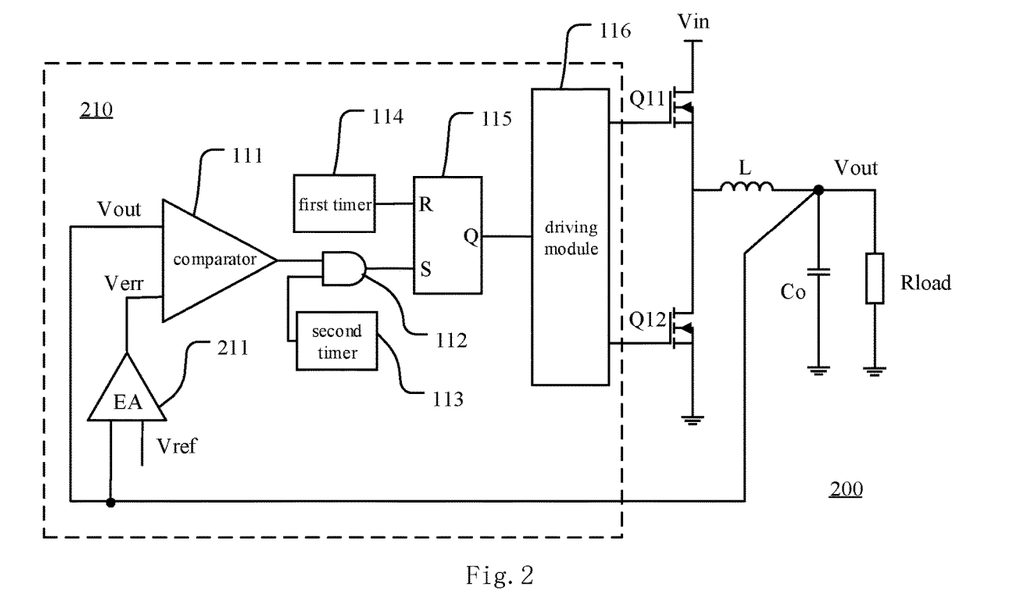
FIG. 2 shows a schematic circuit diagram of another switching converter according to the prior art.

FIG. 2 shows a schematic circuit diagram of another switching converter according to the prior art. A control circuit 210 of the switching converter 200 includes an error amplifier 211 for comparing the DC output voltage Vout with the reference voltage Vref to generate an error signal Verr. The comparator 111 further compares the DC output voltage Vout with the error signal Verr to obtain an intermediate signal. The control circuit 210 can eliminate the output voltage regulation problem. However, in some high density applications, a multilayer ceramic capacitor is set at the output terminal of the switching converter 200 as an output capacitor. This type of output filter produces very small output voltage ripple even in the condition that a great deal of noise exists. Because the control circuit 210 adopts the ripple-based control method to perform dynamic adjustment, the small output voltage ripple produced at the output terminal may cause instability to the control system.

Figure 3:
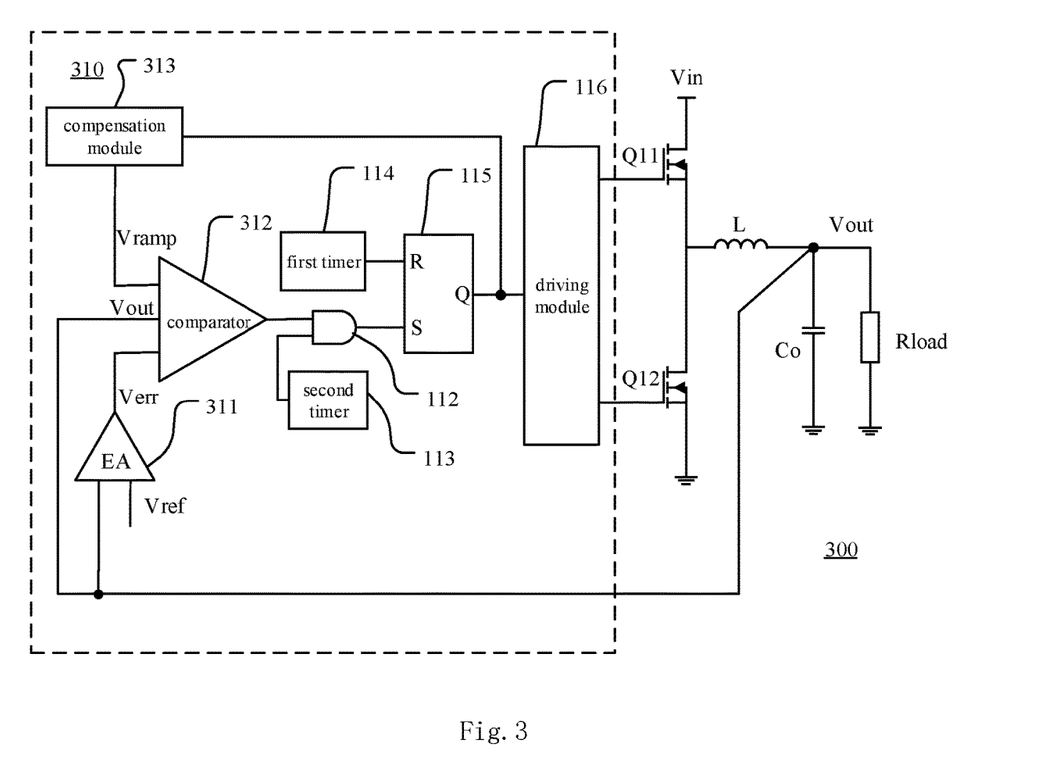
FIG. 3 shows a schematic circuit diagram of another switching converter according to the prior art.

FIG. 3 shows a schematic circuit diagram of another switching converter according to the prior art. A control circuit 310 of the switching converter 300 includes an error amplifier 311 and a compensation module 313. The error amplifier 311 compares the DC output voltage Vout with the reference voltage Vref to generate the error signal Verr. The compensation module 313 generates a ramp signal Vramp in accordance with the pulse width modulation signal PWM. The comparator 312 further compares the DC output voltage Vout, the error signal Verr, and the ramp signal Vramp to obtain an intermediate signal. The control circuit 310 can eliminate the output voltage regulation problem, and can maintain the control system stable and suppress the output voltage ripple through introducing the additional ramp signal generated by the compensation module.

In the above switching controller, the control circuit uses the ramp signal having a constant slope as a compensation signal of the comparator to maintain the system stable. The higher the slope of the ramp signal is, the lower the jitter of the control system is, and thus, the control system is more stable but has worse transient performance. In the case that the ramp signal having a constant slope is used for compensation, the stability and transient performance of the switching converter are not optimal.

SUMMARY OF THE DISCLOSURE

An objective of the present disclosure is to provide a switching converter, a control method and a control circuit thereof, wherein, the slope of the ramp signal is adaptively adjusted based on the output voltage to improve the stability and transient performance of the switching converter.

According to an aspect of the present disclosure, there is provided the control circuit of the switching converter, the switching converter converts a DC input voltage into a DC output voltage, the control circuit comprising:

a compensation module, configured to generate a ramp signal;

a comparator, configured to compare a first superimposed signal related to the DC output voltage with a second superimposed signal related to the ramp signal and an error signal of the DC output voltage, so that an intermediate signal is obtained to generate a set signal;

a first RS flip-flop, configured to generate a pulse width modulation signal in accordance with the set signal and a reset signal, obtain a constant on time in accordance with the reset signal, and obtain an off time related to the DC output voltage in accordance with the set signal; and a driving module, configured to convert the pulse width modulation signal into a switching control signal, wherein the compensation module adaptively adjusts the slope of the ramp signal in accordance with the DC output voltage.

Preferably, the control circuit further comprises:

an AND gate having a first input terminal to receive the intermediate signal, a second input terminal to receive a minimum off time, and an output terminal to provide the set signal, wherein the minimum off time is a constant time period.

Preferably, the control circuit further comprises:

a first timer configured to generate the reset signal;

a second timer configured to generate the minimum off time.

Preferably, the control circuit further comprises:

an error amplifier configured to compare the DC output voltage with a reference voltage to obtain the error signal.

Preferably, the compensation module comprises:

a voltage detection module configured to generate a command signal in accordance with the DC output voltage and a reference voltage, wherein the command signal is proportional with the DC output voltage;

a sample and hold module configured to sample and hold an error signal between the command signal and the ramp signal to obtain a sampling signal;

a ramp signal generating module configured to generate the ramp signal in accordance with the sampling signal, wherein a slope of the ramp signal is related to the amplitude of the DC output voltage; and an equalizing switch being coupled between an output terminal of the voltage detection module and an output terminal of the ramp signal generating module.

Preferably, the voltage detection module comprises:

a low pass filter configured to filter the DC output voltage and slow down response time;

a first voltage gain circuit configured to perform gain amplification on the DC output voltage to obtain an amplified DC output voltage and a second voltage gain circuit configured to perform gain amplification on the reference voltage to obtain an amplified reference voltage;

an adder configured to adding the amplified DC output voltage and the amplified reference voltage to obtain the command signal.

Preferably, the sample and hold module comprises:

a transconductance amplifier configured to convert the error signal between the command signal and the ramp signal into an error current;

a first switch and a first capacitor being coupled in series between an output terminal of the transconductance amplifier and a ground terminal, the error signal is sampled when the first switch is turned on and held when the first switch is turned off, and the error current charges the first capacitor during a sampling time period to obtain the sampling signal, wherein, an on state of the first switch is controlled by a sample and hold signal, and when the switching converter is operated in continuous current mode, the sampling is performed during the first time period starting from the rising edge of the pulse width modulation signal, when the switching converter is operated in discontinuous current mode, the sampling is performed during the first time period starting from a time instant when a current detecting signal of an inducting current crosses zero.

Preferably, the ramp signal generating module comprises:

a voltage-to-current converter configured to generate a charging current corresponding to the sampling signal;

a second capacitor being coupled between an output terminal of the voltage-to-current converter and a ground terminal; and a second resistor and a second switch being coupled in series to form a discharge path between two ends of the second capacitor, wherein, the second capacitor is charged by the charging current, and an on state of the second switch is controlled by a discharge signal, and the second capacitor is discharged during a second time period starting from the falling edge of the pulse width modulation signal to obtain the ramp signal.

Preferably, the control circuit further comprises:

a mode detecting module configured to obtain a current mode signal in accordance with a zero-crossing detection for the current detecting signal of an inducting current.

Preferably, the control circuit further comprises:

a control module configured to generate a sample and hold signal, a discharge signal, and an equalizing signal for respectively controlling a first switch of the sample and hold module, a second switch of the ramp signal generating module and the equalizing switch, in accordance with the pulse width modulation signal and the current mode signal.

Preferably, the control module comprises:

a second RS flip-flop;

an OR gate, a first one-shot circuit and a second one-shot circuit being coupled in series, wherein, a first input terminal and a second input terminal of the OR gate respectively receive the pulse width modulation signal and the current mode signal, and an output terminal of the second one-shot circuit is coupled to a set terminal of the second RS flip-flop;

a third one-shot circuit having an output terminal being coupled to a reset terminal of the second RS flip-flop;

a fourth one-shot circuit having an input terminal being coupled to a second output terminal of the second RS flip-flop, wherein, an output terminal of the first one-shot circuit provides the sample and hold signal, an output terminal of the fourth one-shot circuit provides the discharge signal, and a first output terminal of the second RS flip-flop provides the equalizing signal.

Preferably, the control module controls on states of the first switch, the second switch, and the equalizing switch, during a first time period of a switching cycle of the pulse width modulation signal, the sample and hold module samples the error signal between the command signal and the ramp signal to obtain the sampling signal;

during a third time period of the switching cycle of the pulse width modulation signal, the ramp signal generating module charges a capacitor with a charging current generated in accordance with the sampling signal;

during a second time period of the switching cycle of the pulse width modulation signal, the ramp signal generating module discharges the capacitor through a discharge path; and during a fourth time period of the switching cycle of the pulse width modulation signal, the equalizing switch is turned on to equalize the command signal and the ramp signal, wherein, the first time period, the fourth time period, the second time period, and the third time period are consecutive time periods.

Preferably, the slope of the ramp signal is proportional with the DC output voltage.

According to another aspect of the present disclosure, there is provided a switching converter, comprising:

a main circuit having at least one transistor to control power transmission from an input terminal to an output terminal, so that a DC input voltage is converted into a DC output voltage;

a control circuit provided by the embodiments of the disclosure, for generating the switching control signal to control on state of the at least one transistor.

Preferably, the main circuit is a topology selected from a group consisting of a buck topology, a boost topology, a buck-boost topology, a non-inverter buck-boost topology, a forward topology and a flyback topology.

Preferably, the at least one transistor comprises: a high-side transistor and a low-side transistor being coupled in series between the input terminal and a ground terminal, and the main circuit further comprises:

an inductor being coupled between an intermediate node between the high-side transistor and the low-side transistor and the output terminal; and an output capacitor being coupled between the output terminal and the ground terminal, wherein, the switching control signal for the high-side transistor is an in-phase signal of the pulse width modulation signal, and the switching control signal for the low-side transistor is an inverted signal of the pulse width modulation signal.

Preferably, the main circuit further comprises:

a current sensor being coupled between the low-side transistor and a ground terminal, which obtains a current detecting signal related to an inducting current of the inductor when the low-side transistor is turned on.

According to another aspect of the present disclosure, there is provided a control method of a switching converter, comprising:

generating a ramp signal in accordance with a DC output voltage of the switching converter;

comparing a first superimposed signal related to the DC output voltage with a second superimposed signal related to an error signal of the DC output voltage and the ramp signal to obtain an intermediate signal;

generating a reset signal with a constant cycle to obtain a constant on time;

generating a set signal in accordance with the intermediate signal to obtain an off time related to the DC output voltage;

generating a pulse width modulation signal in accordance with the set signal and the reset signal;

converting the pulse width modulation signal into a switching control signal, wherein the slope of the ramp signal is adaptively adjusted in accordance with the DC output voltage.

Preferably, the step of generating a ramp signal comprises:

generating a command signal in accordance with the DC output voltage;

sampling an error signal between the command signal and the ramp signal to obtain a sampling signal during a first period of a switching cycle of the pulse width modulation signal;

charging a capacitor with a charging current generated in accordance with the sampling signal during a third time period of the switching cycle of the pulse width modulation signal;

discharging the capacitor through a discharge path during a second time period of the switching cycle of the pulse width modulation signal;

equalizing the command signal and the ramp signal during a fourth time period of the switching cycle of the pulse width modulation signal, wherein, the first time period, the fourth time period, the second time period, and the third time period are consecutive time periods.

Preferably, the first time period is a predetermined time period starting from the rising edge of the pulse width modulation signal, and the second time period is a predetermined time period starting from the falling edge of the pulse width modulation signal.

Preferably, the first time period is a predetermined time period starting from a time instant when an inducting current crosses zero; and the second time period is a predetermined time period starting from a falling edge of the pulse width modulation signal.

Preferably, the command signal is proportional with the DC output voltage.

Preferably, the control method further comprises:

using a second timer to obtain a minimum off time, wherein the off time is greater than the minimum off time.

The control circuit according to an embodiment of the present disclosure is used for generating the switching control signal having the constant on time to control the on states of the transistors of the switching converter. The control circuit generates the ramp signal by the compensation module, compares the first superimposed signal related to the DC output voltage with the second superimposed signal related to the error signal of the DC output voltage and the ramp signal to obtain the intermediate signal by the comparator, and then controls the off time of the transistor of the switching converter in accordance with the intermediate signal. Therefore, the off time of the transistor is dynamically adjusted in accordance with the error signal of the DC output voltage, so that the output ripple is suppressed. The compensation module adaptively adjusts the slope of the ramp signal in accordance with the DC output voltage, so that both the stability and transient performance of the switching converter are improved.

In a preferred embodiment, in the compensation module of the control circuit, the sample and hold signal, the discharge signal, and the equalizing signal are generated to respectively control the first switch of the sample and hold module, the second switch of the ramp signal generating module, and the equalizing switch, in accordance with the pulse width modulation signal and the current mode signal, so that sampling, equalizing, discharging and charging are performed in consecutive time periods to obtain the segmented ramp signal related to the switching control signal of the switching converter. The slope of this ramp signal is proportional with the DC output voltage.

The control circuit can be applied to the switching converters having different topologies, and the compensation module can automatically adapt to current modes of the switching converters, so that the design cost and manufacturing cost for redesigning the control circuit for different types of switching converters are reduced.

BRIEF DESCRIPTION OF THE DRAWINGS

Exemplary embodiments of the present disclosure will be described in more details below with reference to the accompanying drawings.

DETAILED DESCRIPTION OF THE DISCLOSURE

Exemplary embodiments of the present disclosure will be described in more details below with reference to the accompanying drawings. In the drawings, like reference numerals denote like members. The figures are not drawn to scale, for the sake of clarity. In addition, some well-known parts may not be shown in the figures.

The embodiments of the disclosure can be presented in various forms, some of which will be described below.

Figure 4:
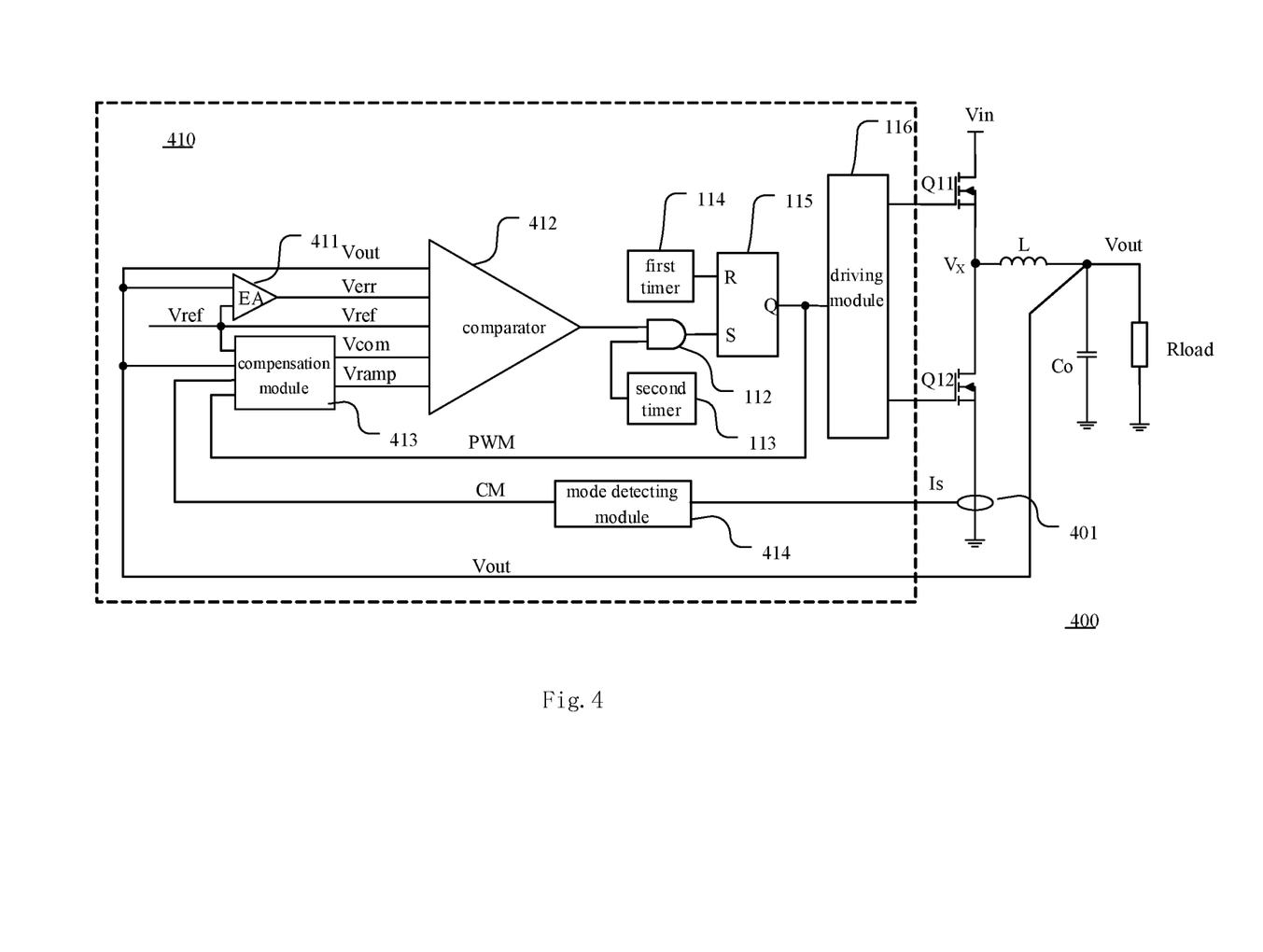
FIG. 4 shows a schematic circuit diagram of a switching converter in accordance with an embodiment of the present disclosure.

FIG. 4 shows a schematic circuit diagram of a switching converter in accordance with an embodiment of the present disclosure.

A main circuit of the switching converter 400 includes transistors Q11 and Q12 being coupled in series between an input terminal and a ground terminal. An inductor L is coupled between an intermediate node between the transistors Q11 and Q12 and an output terminal, and a capacitor Co is coupled between the output terminal and the ground terminal. The input terminal of the main circuit receives a DC input voltage Vin, and the output terminal provides an DC output voltage Vout. The transistors Q11 and Q12 are, for example, referred to as a high-side transistor and a low-side transistor, respectively. A control circuit 410 of the switching converter 400 is used for providing a switching control signal to the transistors Q11 and Q12. The switching control signal is a driving signal generated based on a pulse width modulation signal. For example, the switching control signal for the transistor Q11 is an in-phase signal of the pulse width modulation signal, and the switching control signal for the switch Q12 is an inverted signal of the pulse width modulation signal. When the transistor Q12 is turned on, a mode detecting module 414 can obtain a current detecting signal Is related to an inducting current of the inductor L. A current sensor can be, for example, a sampling resistor being coupled in series to the transistor Q12.

The control circuit 410 includes an error amplifier 411, a comparator 412, a compensation module 413, the mode detecting module 414, an AND gate 112, a second timer 113, a first timer 114, an RS flip-flop 115, and a driving module 116.

The error amplifier 411 compares the DC output voltage Vout with a reference voltage Vref to generate an error signal Verr.

The mode detecting module 414 is coupled to the current sensor 401 to obtain the current detecting signal Is, and generates a current mode signal CM in accordance with the current detecting signal. For example, during a switching cycle, if the current detecting signal Is crosses zero, the current mode signal CM is at high level, which indicates that the switching converter 400 is operated in Discontinuous Current Mode (DCM), if the current detecting signal Is does not cross zero, the current mode signal CM is at low level, which indicates that the switching converter 400 is operated in Continuous Current Mode (CCM).

The compensation module 413 generates a ramp signal Vramp in accordance with the DC output voltage Vout, the current mode signal CM, and a pulse width modulation signal PWM, and generates a command signal Vcom in accordance with the DC output voltage Vout and the reference voltage Vref. The magnitude of the command signal Vcom is proportional with the DC output voltage Vout for defining the slope of the ramp signal Vramp. The switching converter 400 provided by the embodiment of the disclosure differs from the switching converters according to the prior art provided in the FIG. 1 to FIG. 3 in that the slope of the ramp signal Vramp generated by the compensation module 413 is not constant, the slope is related to the command signal Vcom, that is, it is related to the DC output voltage Vout, so that the compensation module 413 has a function of adaptive ramp modulation.

The comparator 412 further compares a first superimposed signal of the DC output voltage Vout and the command signal Vcom with a second superimposed signal of the error signal Verr, the ramp signal Vramp and the reference voltage Vref to obtain an intermediate signal for generating a set signal for controlling an off time of the pulse width modulation signal PWM. The control circuit 410 can eliminate the voltage regulation problem, and can maintain the control system stable and suppress the output ripple by introducing the additional ramp signal by use of the compensation module.

The first timer 114 sets a constant on time Ton of a switching cycle T, thereby generating a reset signal. The second timer 113 sets a minimum off time Toff_min (or a maximum switching frequency) corresponding to a predetermined output voltage and a predetermined load. The AND gate 112 has two input terminals for receiving the intermediate signal generated by the comparator 412 and the minimum off time Toff_min, respectively, and an output terminal providing the set signal. The RS flip-flop 115 generates the pulse width modulation signal PWM in accordance with the reset signal and the set signal. The driving module 116 converts the pulse width modulation signal PWM into the switching control signal to control on states of the transistors Q11 and Q12.

In the switching converter 410 in accordance with the embodiment, the first timer 114 sets the constant on time so that the on time of the switching control signal is a constant value. When the DC output voltage Vout is greater than or equal to the error signal Verr, the off stage of the switching control signal is active, so that an off time which is dynamically adjusted in accordance with the DC output voltage Vout is generated. The off time is greater than the minimum off time. Through dynamic adjustment, the ripple of the DC output voltage Vout is reduced.

Further, the control circuit 410 adaptively adjusts the slope of the ramp signal Vramp in accordance with the operating mode of the switching converter and the DC output voltage Vout, so that both of the stability and transient performance of the switching converter are improved.

Figure 5:
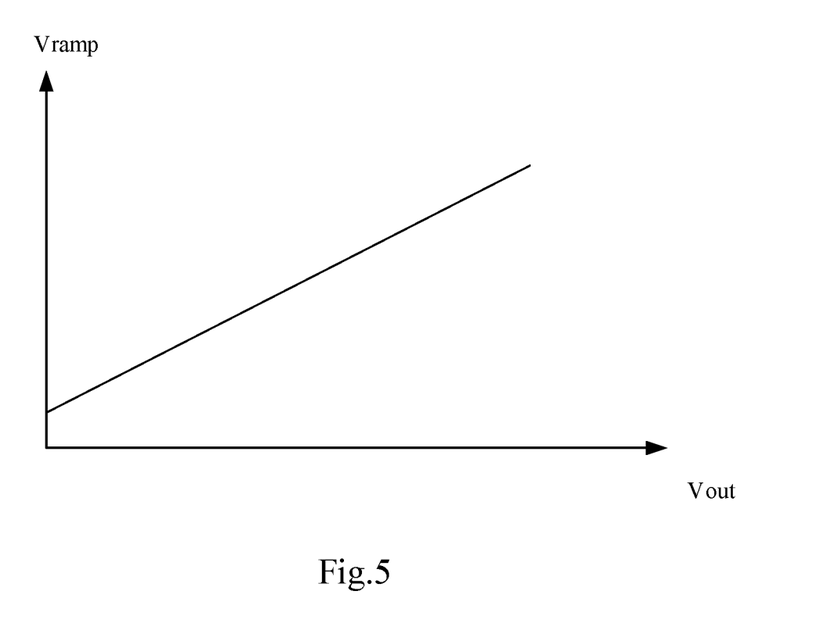
FIG. 5 is a schematic diagram showing a relationship between the amplitude of a ramp signal and the amplitude of an DC output voltage in a switching converter according to an embodiment of the present disclosure.

FIG. 5 is a schematic diagram showing a relationship between the amplitude of the ramp signal and the amplitude of the DC output voltage in the switching converter according to the embodiment of the present disclosure. The amplitude of the ramp signal Vramp generated by the compensation module 413 of the switching converter 400 according to the embodiment of the present disclosure is not constant, and the amplitude is related to the command signal Vcom, that is, related to the DC output voltage Vout.

Figure 6:
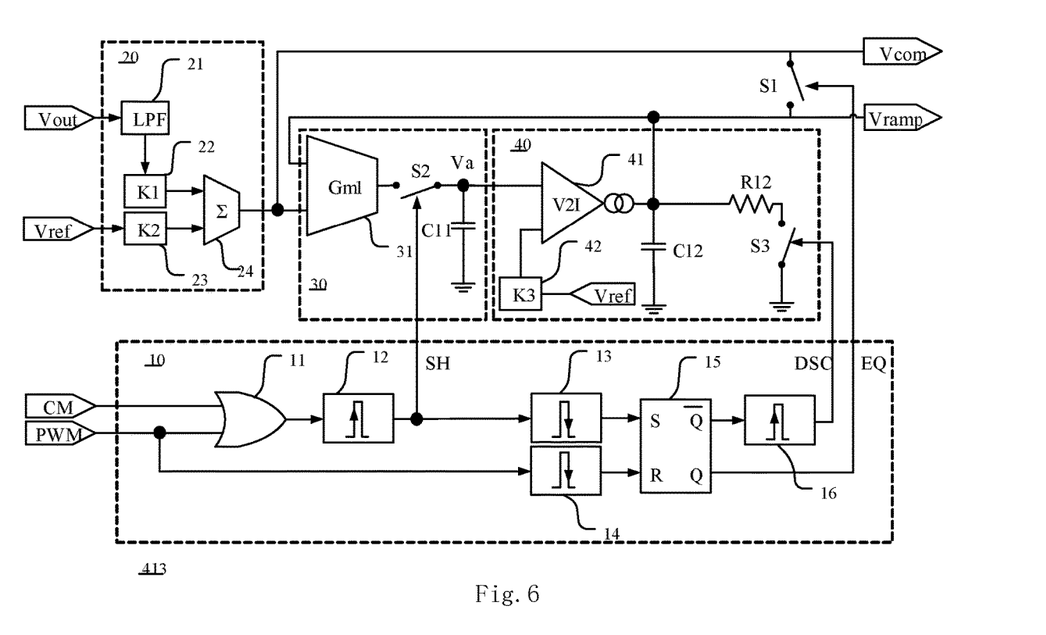
FIG. 6 shows a schematic circuit diagram of a compensation module in a switching converter according to an embodiment of the present disclosure.

FIG. 6 shows a schematic circuit diagram of the compensation module in a switching converter according to an embodiment of the present disclosure. The compensation module 413 includes a control module 10, a voltage detection module 20, a sample and hold module 30, a ramp signal generating module 40, and an equalizing switch S1.

The control module 10 generates a plurality of switching control signals including a sample and hold signal SH, a discharge signal DSC, and an equalizing signal EQ, in accordance with the pulse width modulation signal PWM and the current mode signal CM. The control module 10 includes an OR gate 11, one-shot circuits 12 to 14, a one-shot circuit 16 and an RS flip-flop 15.

The equalizing switch S1 is coupled between an output terminal of the voltage detection module 20 and an output terminal of the ramp signal generating module 40. When the equalizing signal EQ is active, the output terminal of the voltage detection module 20 is coupled to the output terminal of the ramp signal generating module 40, so that the command signal Vcom and the ramp signal Vramp are equalized.

In the control module 10, two input terminals of the OR gate 11 receive the pulse width modulation signal PWM and the current mode signal CM, respectively, and an output terminal of the OR gate 11 is coupled to an input terminal of the one-shot circuit 12. The sample and hold signal SH provided by an output terminal of the one-shot circuit 12 is active when any one of the pulse width modulation signal PWM and the current mode signal CM is active. Input terminals of the one-shot circuits 13 and 14 respectively receive the sample and hold signal SH and the pulse width modulation signal PWM, and output terminals are coupled to a set terminal and a reset terminal of the RS flip-flop 15, respectively. A first output terminal (Q terminal) and a second output terminal ($\overline{Q}$ terminal) of the RS flip-flop 15 provide a first logic signal and a second logic signal that are inverted from each other, wherein the first logic signal is used as the equalizing signal EQ, and the discharge signal DSC is generated by the one-shot circuit 16 in accordance with the second logic signal.

The voltage detection module 20 generates the command signal Vcom in accordance with the DC output voltage Vout and the reference voltage Vref. The voltage detection module 20 includes a low pass filter 21, voltage gain circuits 22 and 23, and an adder 24. The DC output voltage Vout may be a voltage signal acquired from the output terminal of the switching converter, or an equivalent voltage signal obtained by averaging node voltages acquired at intermediate nodes between the transistors Q11 and Q12.

In the voltage detection module 20, the DC output voltage Vout is filtered and the response time is slowed down by the low pass filter 21, and then the DC output voltage Vout is provided to one input terminal of the adder 24 through the voltage gain circuit 22. The reference voltage Vref is provided to the other input terminal of the adder 24 through the voltage gain circuit 22. The adder 24 adds the two ones to obtain the command signal Vcom, which can be expressed as:

$$V\text{com}=V\text{out}*K1+V\text{ref}*K2 \quad (1)$$

wherein, K1 and K2 are gain coefficients of the voltage gain circuits 22 and 23, respectively, and they are constant values, respectively.

The sample and hold module 30 samples and holds the error signal between the command signal Vcom and the ramp signal Vramp to obtain a sampling signal Va. The sample and hold module 30 includes a transconductance amplifier 31, a switch S2, and a capacitor C11.

In the sample and hold module 30, the transconductance amplifier 31 converts the error signal between the command signal Vcom and the ramp signal Vramp into an error current. The switch S2 is controlled to be on and off by the sample and hold signal SH. When the switch S2 is on, the error current charges the capacitor C11 to obtain the sampling signal Va. When the switch S2 is turned off, the capacitor C11 holds the sampling signal Va.

The ramp signal generating module 40 includes a voltage-to-current converter (V2I) 41, a voltage gain circuit 42, a capacitor C12, a resistor R12, and a switch S3.

In the ramp signal generating module 40, the voltage-to-current converter 41 generates a charging current corresponding to the sampling signal Va. The charging current charges the capacitor C12 to generate the ramp signal Vamp. The resistor R12 and the switch S3 are coupled in series between two ends of the capacitor C12 to form a discharge path. The switch S3 is controlled to be on and off by the discharge signal DSC.

In each switching cycle of the switching converter 400, the switch S3 is turned on for a time period and turned off for a time period. When the switch S3 is turned off, the charging current charges the capacitor C12, and the voltage between the two ends of the capacitor C12 gradually increases. When the switch S3 is turned on, the capacitor C12 is discharged through the discharge path. Thus, the ramp signal generating module 40 generates the ramp signal which has a same switching cycle with that of the switching converter 400.

When the switch S2 is on, the charging current of the capacitor C12 is automatically adjusted by the transconductance amplifier 31. After the control system is operated stably and when the switch Q12 is off, the ramp signal Vramp can be expressed as:

$$V\text{ramp}=V\text{com} \quad (2)$$

When the switch S1 is off and the switch S2 is on, the input signal Va for the voltage-to-current converter 41 can be expressed as:

$$Va = (Vout*K1 + Vref*K2) * \frac{Tos}{R12*V2I*Toff} + K3*Vref \quad (3)$$

wherein, K3 is a gain coefficient of the voltage gain circuit 42, Tos is a discharge time of the switch S3, and V2I is a gain coefficient of the voltage-to-current converter 41, and Toff is an off time of the switch Q11.

Finally, when the switch Q11 is off, the compensation slope Se of the entire system can be represented as:

$$Se = \frac{\Delta Vramp}{Toff} = (Vout * K1 + Vref * K2) * \frac{Tos}{R12 * C12 * Toff} \quad (4)$$

Figure 7:
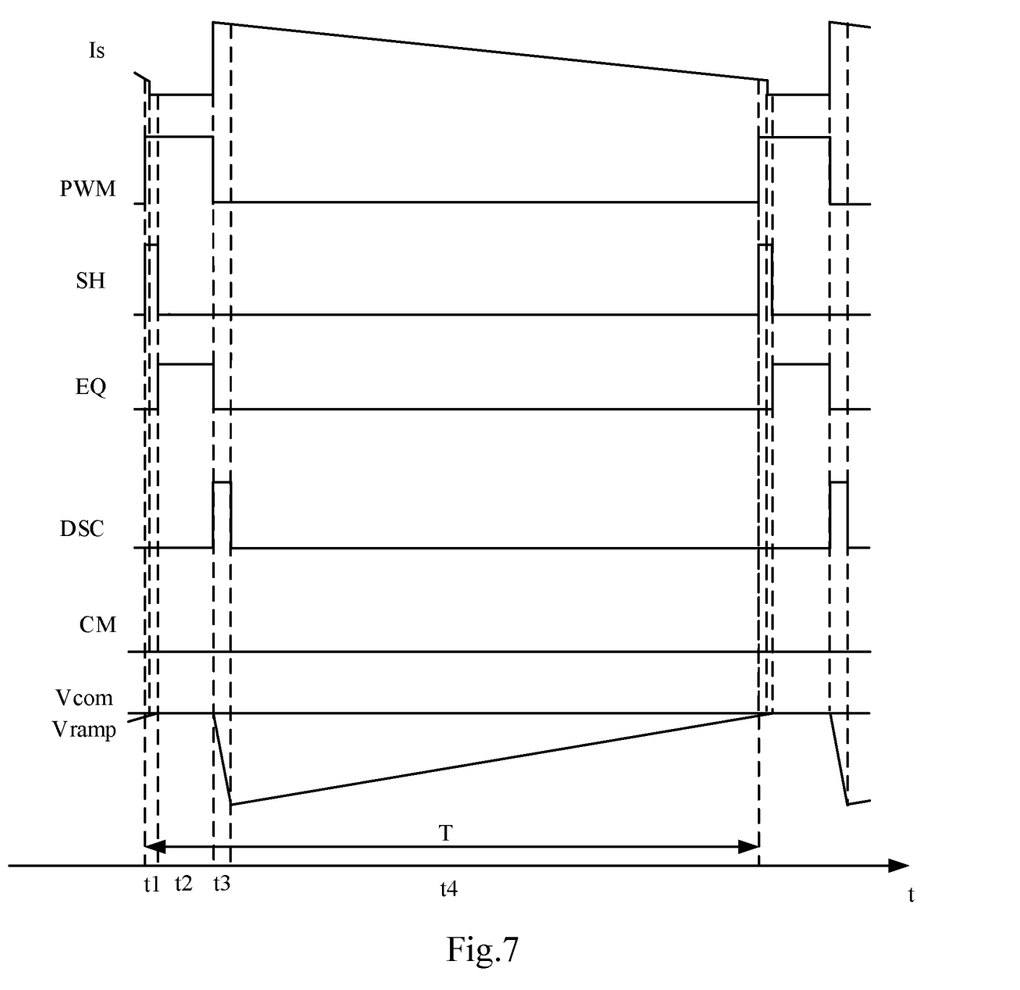
FIG. 7 is a schematic waveform diagram of the compensation module provided in FIG. 6 and operated in Continuous Current Mode (CCM)

FIG. 7 is a schematic waveform diagram of the compensation module provided in FIG. 6 and operated in Continuous Current Mode (CCM). In the figure, curves Is, PWM, SH, EQ, DSC, CM, Vcom, and Vramp represent the current detecting signal related to the inducting current when the transistor Q12 is on, the pulse width modulation signal related to the transistor Q11, the sample and hold signal, the equalizing signal, the discharge signal, the current mode signal, the command signal and the ramp signal, respectively.

The command signal Vcom is a superimposed signal generated based on the DC output voltage Vout and the reference voltage Vref, and its value is as shown in the equation (1).

The compensation module is, for example, the compensation module 413 in the switching converter 400 shown in FIG. 4. In this embodiment, the switching converter 400 is operated in Continuous Current Mode (CCM). During the switching cycle of the switching converter 400, the current detecting signal Is does not cross zero when transistor Q12 is on, and the current mode signal CM is inactive.

In each switching cycle T, the sample and hold signal SH and the discharge signal DSC are pulse signals triggered at the rising edge and falling edge of the pulse width modulation signal PWM, respectively, and they last for a first time period t1 and a third time period t3. The sample and hold signal SH and the discharge signal DSC are used for controlling the switches S2 and S3, respectively, and the command signal Vcom is sampled during the first time period t1 from the start time of the on time period of the transistor Q11 in the switching converter 400 to obtain the sampling signal Va, and the capacitor C12 is discharged during the third time period t3 from the start time of the off time period of the transistor Q11.

The equalizing signal EQ is a pulse signal that is triggered at the falling edge of the sample and hold signal SH and lasts to the falling edge of the pulse width modulation signal PWM. The equalizing signal EQ is used for controlling the on state of the equalizing switch S1. That is, while the equalizing signal EQ is active, the equalizing switch S1 is turned on, so that the command signal Vcom and the ramp signal Vramp are equalized.

The compensation module 413 generates the segmented ramp signal Vramp related to the switching control signal of the switching converter 400. At the start time of each switching cycle, that is, during the first time period t1 from the start time of the on time period of the transistor Q11, the command signal Vcom is sampled to generate the sampling signal Va, at the time, the ramp signal Vramp is gradually increased to a peak value, that is, the ramp signal Vramp is increased to the command signal Vcom. The ramp signal Vramp is equalized to the command signal Vcom during the remaining second period t2 of the on time period of the transistor Q11, at the time, the ramp signal Vramp is equal to the command signal Vcom, constantly. At the third time period t3 from the start time of the off time period of the transistor Q11, the capacitor C12 is discharged, and the ramp signal Vramp is gradually decreased to a valley value. The valley value of the ramp signal Vramp is related to three factors: the resistance of the resistor R12, the on time period of the switch S3, and the peak value of the ramp signal Vramp. At the remaining fourth time period t4 of the off time period of the transistor Q11, the capacitor C12 is charged by the charging current related to the sampling signal Va, and the ramp signal Vramp is gradually increased until the next switching cycle begins.

In the control circuit 410 of the switching converter 400, the comparator 412 further compares the first superimposed signal generated based on the DC output voltage Vout and the command signal Vcom with the second superimposed signal generated based on the error signal Verr, the ramp signal Vramp and the reference voltage Vref to obtain the intermediate signal, and the intermediate signal is used for generating the set signal for controlling the off time of the pulse width modulation signal PWM. The control circuit 410 can eliminate the voltage regulation problem, and introduce the additional ramp signal by use of the compensation module. The slope of the ramp signal Vramp is adaptively adjusted in accordance with the DC output voltage Vout, and the resulting compensation slope Se of the system is as shown in equation (4), so that the control system can be maintained to be stable and the output ripple can be suppressed.

Figure 8:
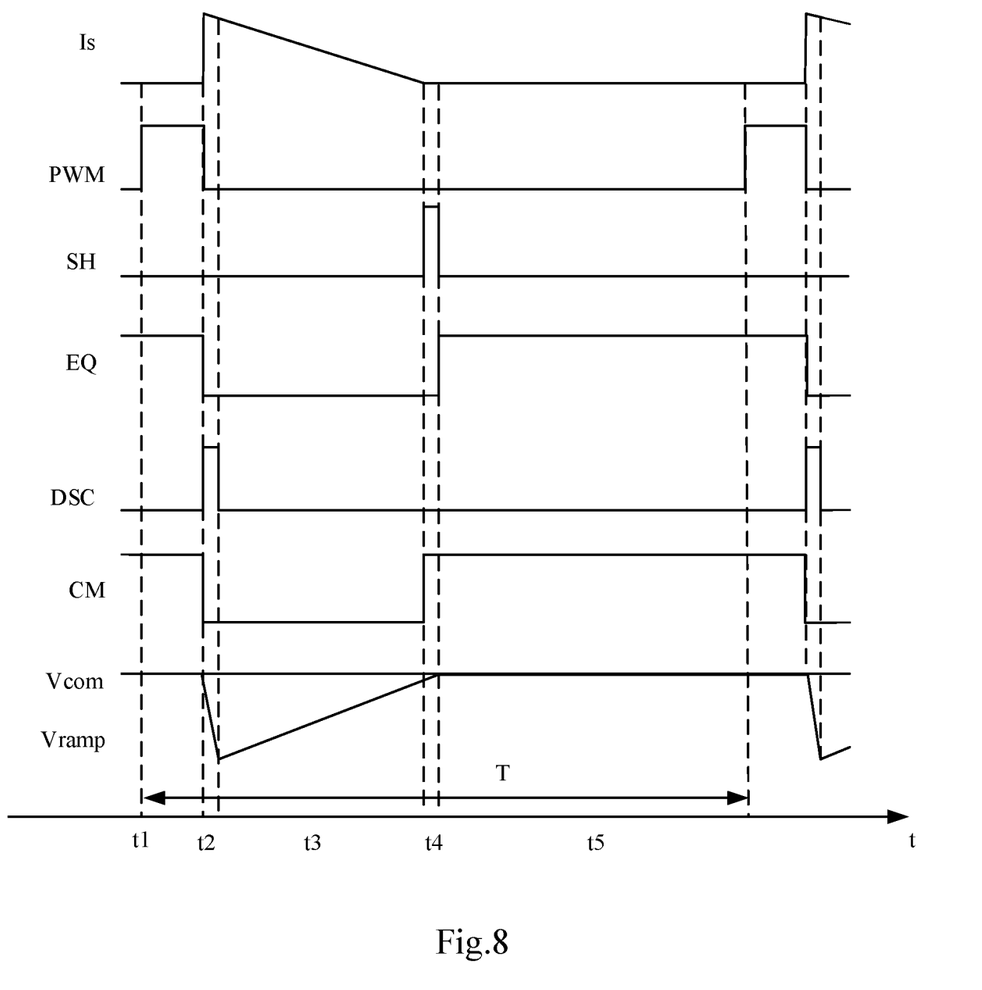
FIG. 8 is a schematic waveform diagram of the compensation module provided in FIG. 6 and operated in Discontinuous Current Mode (DCM)

FIG. 8 is a schematic waveform diagram of the compensation provided in FIG. 6 and operated in Discontinuous Current Mode (DCM). In the figure, the curves Is, PWM, SH, EQ, DSC, CM, Vcom, and Vramp represent the current detecting signal related to the inducting current when the transistor Q12 is on, the pulse width modulation signal related to the transistor Q11, the sample and hold signal, the equalizing signal, the discharge signal, the current mode signal, the command signal and the ramp signal, respectively.

The command signal Vcom is a superimposed signal generated based on the DC output voltage Vout and the reference voltage Vref, and its value is as shown in the equation (1).

The compensation module is, for example, the compensation module 413 used in the switching converter 400 shown in FIG. 4. In this embodiment, the switching converter 400 is operated in Discontinuous Current Mode (DCM). In the switching cycle of the switching converter 400, because the transistor Q12 is on while the pulse width modulation signal PWM is at low level, the current detecting signal Is crosses zero when the transistor Q12 is on, and the current mode signal CM is inactive during the time period from the falling edge of the pulse width modulation signal PWM to the time instant when the current detecting signal Is crosses zero, and the current mode signal CM is active during the remaining time period of the pulse width modulation signal PWM.

In each switching cycle T, the sample and hold signal SH is a pulse signal triggered by the rising edge of the current mode signal CM, which lasts for the fourth time period T4, and the discharge signal DSC is a pulse signal triggered by the falling edge of the pulse width modulation signal PWM, which lasts for the second time period t2. The sample and hold signal SH and the discharge signal DSC are used for controlling the switches S2 and S3, respectively. The command signal Vcom is sampled to obtain the sampling signal Va during the fourth time period t4 from the time instant when the current of the switching converter 400 crosses zero, and the capacitor C12 is discharged during the second period t2 from the start time of the off time period of the transistor Q11.

The equalizing signal EQ is a pulse signal that is triggered by the falling edge of the sample and hold signal SH and last to the falling edge of the pulse width modulation signal PWM. The equalizing signal EQ is used for controlling on state of the equalizing switch S1. That is, when the equalizing signal EQ is active, the equalizing switch S1 is on, so that the command signal Vcom is equalized to the ramp signal Vramp.

The compensation module 413 generates the segmented ramp signal Vramp related to the switching control signals of the switching converter 400. During each switching cycle T, that is, during the first time period t1 corresponding to the on time period of the switching transistor Q11, the equalizing switch S1 is turned on, and the ramp signal Vramp is equalized to be the command signal Vcom. In the second period t2 starting from the start time of the off time period of the transistor Q11, the capacitor C12 is discharged, and the ramp signal Vramp is gradually decreased to a valley value. The valley value of the ramp signal Vramp is related to three factors: the resistance of the resistor R12, the on time period of the switch S3, and the peak value of the ramp signal Vramp. In the subsequent third period t3, the capacitor C12 is recharged by using the charging current corresponding to the sampling signal Va of the previous switching cycle. In the fourth time period t4 starting from a time instant when the current crosses zero, the command signal Vcom is sampled by charging the capacitor C11 to generate the sampling signal Va, the sampling signal Va is converted into a current by the voltage-to-current converter (V2I) 41, the charging current of the capacitor C12 is adjusted in accordance with the sampling signal Va, so that the slope of the ramp signal Vramp is changed, at the time, the ramp signal Vramp gradually increases to a peak value, that is, the ramp signal Vramp increases to the command signal Vcom. In a fifth time period t5 from the start time of the off time period of the transistor Q11, the ramp signal Vramp is equalized to be the command signal Vcom, and at the time, the ramp signal Vramp is equal to the command signal Vcom, constantly.

In the control circuit 410 of the switching converter 400, the comparator 412 further compares the first superimposed signal generated based on the DC output voltage Vout and the command signal Vcom with the second superimposed signal generated based on the error signal Verr, the ramp signal Vramp, and the reference voltage Vref to obtain the intermediate signal for generating the set signal for controlling the off time of the pulse width modulation signal. The control circuit 410 can eliminate the voltage regulation problem and introduces the additional ramp signal Vramp by use of the compensation module. The slope of the ramp signal Vramp is adaptively adjusted in accordance with the DC output voltage Vout, and the resulting compensation slope Se of the system is as shown in equation (4), so that the stability of the switching converter can be maintained and the output ripple is suppressed.

Figure 9:
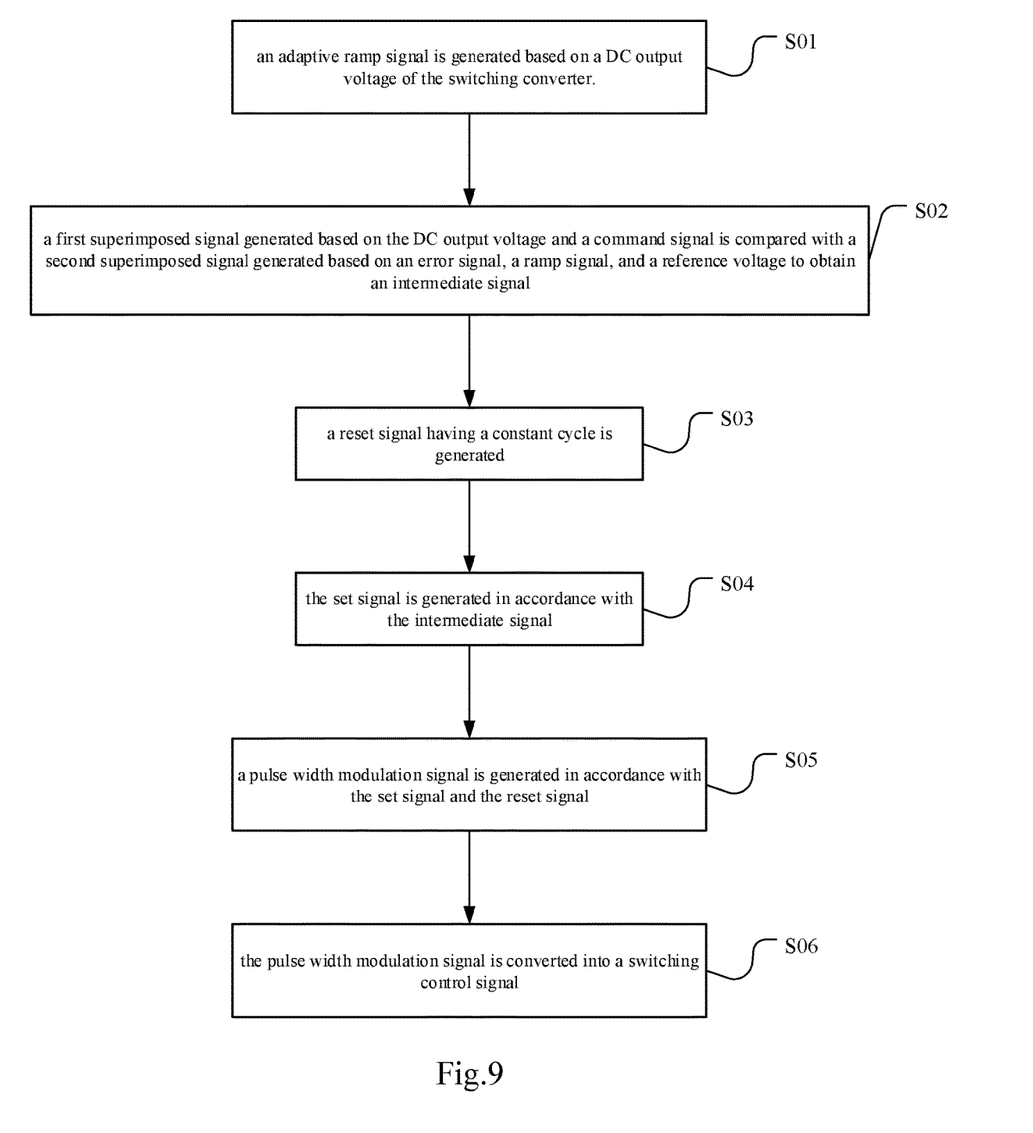
FIG. 9 shows a flow diagram of a control method of a switching converter according to an embodiment of the present disclosure.

FIG. 9 shows a flow diagram of a control method of a switching converter according to an embodiment of the present disclosure. The switching converter is, for example, the switching converter shown in FIG. 4, wherein the control circuit includes the compensation module shown in FIG. 6. The switching converter is operated in Continuous Current Mode (CCM) or Discontinuous Current Mode (DCM).

In step S01, an adaptive ramp signal is generated based on a DC output voltage of the switching converter.

In step S02, a first superimposed signal generated based on the DC output voltage and a command signal is compared with a second superimposed signal generated based on an error signal, a ramp signal, and a reference voltage to obtain an intermediate signal.

In step S03, a reset signal having a constant cycle is generated to obtain a constant on time.

In step S04, the set signal is generated in accordance with the intermediate signal to obtain an off time related to the DC output voltage.

In step S05, a pulse width modulation signal is generated in accordance with the set signal and the reset signal.

In step S06, the pulse width modulation signal is converted into a switching control signal.

The above step S01 includes the step of generating the command signal in accordance with the DC output voltage and a plurality of sub-steps performed in a first time period, a fourth time period, a second time period, and a third time period which are consecutive time periods of the switching cycle of the pulse width modulation signal. In the first time period, the error signal between the command signal and the ramp signal is sampled to obtain a sampling signal. In the third time period, a capacitor is charged by a charging current generated in accordance with the sampling signal. In the second time period, the capacitor is discharged through a discharge path. In the fourth time period, the command signal and the ramp signal are equalized.

When the switching converter is operated in continuous current mode, the first time period is a predetermined time period starting from the rising edge of the pulse width modulation signal, and when the switching converter is operated in discontinuous current mode, the first time period is a predetermined time period starting from the time instant when the current detecting signal of the inducting current crosses zero. Further, in the above two current modes, the second time period is a predetermined time period starting from the falling edge of the pulse width modulation signal.

Preferably, the above step S04 includes the step of obtaining a minimum off time by the second timer, and the off time is greater than the minimum off time.

In the above embodiment, although the switching converter having a buck type topology is described with reference to FIG. 4, it can be understood that the ramp signal having an adaptive slope and generated by the compensating module can also be used in switching converters having other topologies. These topologies include but are not limited to buck topology, boost topology, buck boost topology, non-inverter buck-boost topology, forward topology, flyback topology, and etc.

In the above description, well-known structural elements and steps have not been described in detail. However, those skilled in the art should understand that the corresponding structural elements and steps can be implemented by various technical means. In addition, in order to form the same structural elements, those skilled in the art may also design methods that are not identical to the methods described above. In addition, although the respective embodiments have been described above, this does not mean that the measures in the respective embodiments are not advantageously used in combination.

The embodiments of the present disclosure have been described above. However, these embodiments are for illustrative purposes only and are not intended to limit the scope of the disclosure. The scope of the disclosure is defined by the appended claims and their equivalents. Numerous alternatives and modifications may be made by those skilled in the art without departing from the scope of the disclosure.

The invention claimed is:

1. A control circuit of a switching converter, the switching converter converts a DC input voltage into a DC output voltage, the control circuit comprising:
 a compensation module, configured to generate a command signal is proportional with the DC output voltage, and to generate a ramp signal according to the command signal, wherein the command signal is proportional with the DC output voltage, so that the slope of the ramp signal is related to the amplitude of the DC output voltage;
a comparator, configured to compare a first superimposed signal related to the DC output voltage with a second superimposed signal related to the ramp signal and an error signal of the DC output voltage, so that an intermediate signal is obtained to generate a set signal;
a first RS flip-flop, configured to generate a pulse width modulation signal in accordance with the set signal and a reset signal, obtain a constant on time in accordance with the reset signal, and obtain an off time related to the DC output voltage in accordance with the set signal; and
a driving module, configured to convert the pulse width modulation signal into a switching control signal,
wherein the compensation module adaptively adjusts the slope of the ramp signal in accordance with DC output voltage.

2. The control circuit according to claim 1, further comprising:
an AND gate having a first input terminal to receive the intermediate signal, a second input terminal to receive a minimum off time, and an output terminal to provide the set signal, wherein the minimum off time is a constant time period.

3. The control circuit according to claim 2, further comprising:
a first timer configured to generate the reset signal;
a second timer configured to generate the minimum off time.

4. The control circuit according to claim 1, further comprising:
an error amplifier configured to compare the DC output voltage with a reference voltage to obtain the error signal.

5. The control circuit according to claim 1, wherein, the compensation module comprises:
a voltage detection module configured to generate theft command signal in accordance with the DC output voltage and a reference voltage, wherein the command signal is proportional with the DC output voltage;
a sample and hold module configured to sample and hold an error signal between the command signal and the ramp signal to obtain a sampling signal;
a ramp signal generating module configured to generate the ramp signal in accordance with the sampling signal, wherein the slope of the ramp signal is related to the amplitude of the DC output voltage; and
an equalizing switch being coupled between an output terminal of the voltage detection module and an output terminal of the ramp signal generating module.

6. The control circuit according to claim 5, wherein the voltage detection module comprises:
a low pass filter configured to filter the DC output voltage and slow down response time;
a first voltage gain circuit configured to perform gain amplification on the DC output voltage to obtain an amplified DC output voltage and a second voltage gain circuit configured to perform gain amplification on the reference voltage to obtain an amplified reference voltage;
an adder configured to adding the amplified DC output voltage and the amplified reference voltage to obtain the command signal.

7. The control circuit according to claim 5, wherein the sample and hold module comprises:
a transconductance amplifier configured to convert the error signal between the command signal and the ramp signal into an error current;
a first switch and a first capacitor being coupled in series between an output terminal of the transconductance amplifier and a ground terminal, the error signal is sampled when the first switch is turned on and is held when the first switch is turned off, and the error current charges the first capacitor during a sampling time period to obtain the sampling signal,
wherein, an on state of the first switch is controlled by a sample and hold signal, and when the switching converter is operated in continuous current mode, the sampling is performed during a first time period starting from the rising edge of the pulse width modulation signal, when the switching converter is operated in discontinuous current mode, the sampling is performed during a first time period starting from a time instant when a current detecting signal of an inducting current crosses zero.

8. The control circuit according to claim 5, wherein the ramp signal generating module comprises:
a voltage-to-current converter configured to generate a charging current corresponding to the sampling signal;
a second capacitor being coupled between an output terminal of the voltage-to-current converter and a ground terminal; and
a second resistor and a second switch being coupled in series to form a discharge path between two ends of the second capacitor,
wherein, the second capacitor is charged by the charging current, and an on state of the second switch is controlled by a discharge signal, and the second capacitor is discharged during a second time period starting from the falling edge of the pulse width modulation signal to obtain the ramp signal.

9. The control circuit according to claim 5, further comprising:
a mode detecting module configured to obtain a current mode signal in accordance with a zero-crossing detection for the current detecting signal of an inducting current.

10. The control circuit according to claim 9, further comprising:
a control module configured to generate a sample and hold signal, a discharge signal, and an equalizing signal for respectively controlling a first switch of the sample and hold module, a second switch of the ramp signal generating module and the equalizing switch, in accordance with the pulse width modulation signal and the current mode signal.

11. The control circuit according to claim 10, wherein the control module comprises:
a second RS flip-flop;
an OR gate, a first one-shot circuit and a second one-shot circuit being coupled in series, wherein, a first input terminal and a second input terminal of the OR gate respectively receive the pulse width modulation signal and the current mode signal, and an output terminal of the second one-shot circuit is coupled to a set terminal of the second RS flip-flop;
a third one-shot circuit having an output terminal being coupled to a reset terminal of the second RS flip-flop;

a fourth one-shot circuit having an input terminal being coupled to a second output terminal of the second RS flip-flop, wherein, an output terminal of the first one-shot circuit provides the sample and hold signal, an output terminal of the fourth one-shot circuit provides the discharge signal, and a first output terminal of the second RS flip-flop provides the equalizing signal.

12. The control circuit according to claim 10, wherein the control module controls on states of the first switch, the second switch, and the equalizing switch, during a first time period of a switching cycle of the pulse width modulation signal, the sample and hold module samples the error signal between the command signal and the ramp signal to obtain the sampling signal;

during a third time period of the switching cycle of the pulse width modulation signal, the ramp signal generating module charges a capacitor with a charging current generated in accordance with the sampling signal;

during a second time period of the switching cycle of the pulse width modulation signal, the ramp signal generating module discharges the capacitor through a discharge path; and during a fourth time period of the switching cycle of the pulse width modulation signal, the equalizing switch is turned on to equalize the command signal and the ramp signal, wherein, the first time period, the fourth time period, the second time period, and the third time period are consecutive time periods.

13. The control circuit according to claim 1, wherein the slope of the ramp signal is proportional with the DC output voltage.

14. A switching converter, comprising:

a main circuit having at least one transistor to control power transmission from an input terminal to an output terminal, so that the DC input voltage is converted into the DC output voltage;

the control circuit in accordance with claim 1, for generating the switching control signal to control an on state of the at least one transistor.

15. The switching converter according to claim 14, wherein, the at least one transistor comprises: a high-side transistor and a low-side transistor being coupled in series between the input terminal and a ground terminal, and the main circuit further comprises:

an inductor being coupled between an intermediate node between the high-side transistor and the low-side transistor and the output terminal; and an output capacitor being coupled between the output terminal and the ground terminal, wherein, a high-side control signal for the high-side transistor is an in-phase signal of the pulse width modulation signal, and a low-side control signal for the low-side transistor is an inverted signal of the pulse width modulation signal, the high-side control signal and the low-side control signal are provided by the control circuit.

16. The switching converter according to claim 15, wherein the main circuit further comprises:

a current sensor being coupled between the low-side transistor and the ground terminal, which obtains a current detecting signal related to the inducting current of the inductor when the low-side transistor is turned on.

17. A control method of a switching converter, comprising:

generating a ramp signal in accordance with a DC output voltage of the switching converter;

comparing a first superimposed signal related to the DC output voltage with a second superimposed signal related to an error signal of the DC output voltage and the ramp signal to obtain an intermediate signal;

generating a reset signal with a constant cycle to obtain a constant on time;

generating a set signal in accordance with the intermediate signal to obtain an off time related to the DC output voltage;

generating a pulse width modulation signal in accordance with the set signal and the reset signal;

converting the pulse width modulation signal into a switching control signal, wherein the slope of the ramp signal is adaptively adjusted in accordance with the DC output voltage, wherein the step of generating a ramp signal comprises:

generating a command signal in accordance with the DC output voltage;

generating the ramp signal according to the command signal, wherein the command signal is proportional with the DC output voltage, so that the slope of the ramp signal is related to the amplitude of the DC output voltage.

18. The control method according to claim 17, wherein the step of generating a ramp signal further comprises:

sampling an error signal between the command signal and the ramp signal to obtain a sampling signal during a first period of a switching cycle of the pulse width modulation signal;

charging a capacitor with a charging current generated in accordance with the sampling signal during a third time period of the switching cycle of the pulse width modulation signal;

discharging the capacitor through a discharge path during a second time period of the switching cycle of the pulse width modulation signal;

equalizing the command signal and the ramp signal during a fourth time period of the switching cycle of the pulse width modulation signal, wherein, the first time period, the fourth time period, the second time period, and the third time period are consecutive time periods.

19. The control method according to claim 18, wherein the first time period is a predetermined time period starting from the rising edge of the pulse width modulation signal, and the second time period is a predetermined time period starting from the falling edge of the pulse width modulation signal.

20. The control method according to claim 18, wherein the first time period is a predetermined time period starting from a time instant when an inducting current crosses zero; and the second time period is a predetermined time period starting from the falling edge of the pulse width modulation signal.

21. The control method according to claim 18, wherein the command signal is proportional with the DC output voltage.

22. The control method of claim 18, further comprising:
using a second timer to obtain a minimum off time, wherein the off time is greater than the minimum off time.

\* \* \* \* \*